June 24, 1930.  E. H. LAABS  1,767,593
CLUTCH
Filed Nov. 9, 1927   2 Sheets-Sheet 1

INVENTOR.
Eric H. Laabs.
BY
ATTORNEYS.

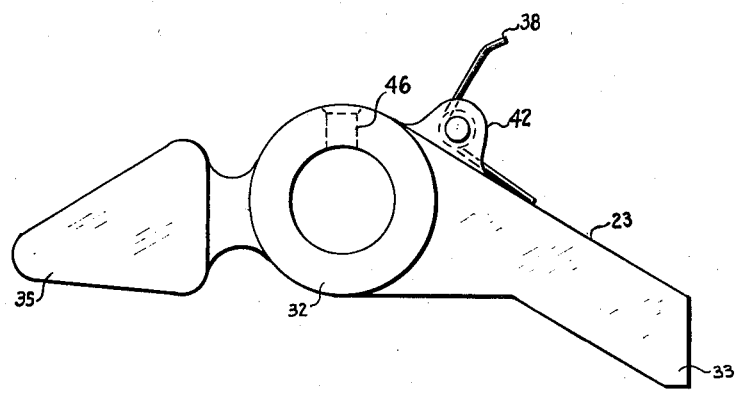
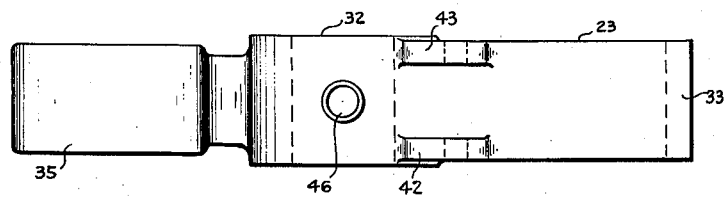
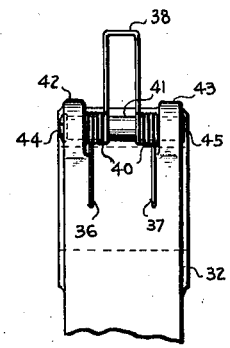

Patented June 24, 1930

1,767,593

UNITED STATES PATENT OFFICE

ERIC H. LAABS, OF MILWAUKEE, WISCONSIN, ASSIGNOR, BY MESNE ASSIGNMENTS, TO CUTLER-HAMMER, INC., A CORPORATION OF DELAWARE

CLUTCH

Application filed November 9, 1927. Serial No. 232,123.

This invention relates to improvements in clutches, and more particularly to improvements in pawls or dogs for use in overtraveling clutch mechanisms.

Overtraveling clutches are ordinarily employed in devices wherein it may be desired to drive a machine or element selectively from one or another of a plurality of sources of power supply. For example, in two-motor printing press drives, wherein a small motor is employed to effect operation of the press at slow speed for threading, or the like, and a large motor is employed to effect operation of the press at a higher speed for running, it is customary to connect the small motor, through suitable speed reducing gearing and the aforementioned overtraveling clutch, to the shaft of the large motor for driving the press at slow speed. Thereafter when the large motor is energized and attains a predetermined degree of acceleration the overtraveling clutch acts automatically to disconnect the small motor from the press.

An overtraveling clutch of the above character comprises essentially a ratchet wheel and a member carrying a plurality of spaced pawls or dogs adapted for selective engagement with the teeth of the ratchet wheel. It has been proposed heretofore to employ ordinary pivoted pawls or dogs for the above purpose, a suitable number of said pawls being arranged upon said member in equally spaced relation to each other around the periphery of the ratchet wheel. However, since the ratchet wheel and pawl carrying member of the clutch are usually mounted upon a horizontal axis it is obvious that less than half of the pawls will be normally in engagement with the ratchet wheel when the parts are at rest, the other pawls being biased by gravity out of engagement with the ratchet wheel.

Moreover, assuming, by way of example, employment of a ratchet wheel having thirty-five teeth and a member carrying eight pawls, the arrangement is preferably such that only one of the eight pawls, even if all were in engagement with the ratchet wheel, would likewise be in actual co-operative engagement with its nearest adjacent tooth; whereas the other pawls would be out of co-operative engagement with their nearest adjacent teeth, respectively, a distance equal to one-eighth, two-eighths, three-eighths, etc., of the length of a tooth. It therefore follows, with an arrangement such as that just described, that upon starting of the small motor to drive the ratchet wheel the latter may travel a distance equal to as much as three-eighths of the length of a tooth before one of the teeth is engaged by its nearest adjacent pawl. This condition would result in a severe jerk in starting or inching the press or other machine being driven, which is manifestly undesirable.

In order to insure engagement of one of the pawls with a tooth of the ratchet wheel after a minimum degree of travel of the latter from a position of rest, it has heretofore been proposed to apply springs to the respective pawls to hold all of the same in engagement with the ratchet wheel when the parts are at rest. However, in a clutch of given size, while pawls of the ordinary type without springs are all adapted to drop out of engagement with the ratchet wheel when the pawl carrying member is operating at the rate of about 65 R. P. M., and are adapted to drop into engagement with said wheel when said element is decelerated to about 60 R. P. M.; it is found that pawls having biasing springs of sufficient strength to hold the pawls on the lower half of the clutch in engagement with the ratchet wheel (when at rest) will likewise be held in engagement with said wheel pending operation of the pawl carrying member at a speed of about 110 R. P. M., and re-engagement of the pawls with the wheel will be effected when the pawl carrying member slows down to about 104 R. P. M.

Inasmuch as the pawl carrying member is operated only at the rate of about 30 R. P. M. during slow speed driving of the press by the small motor, and since the spring-biased pawls aforementioned will be held in engagement with the ratchet wheel pending attainment of a speed of 110 R. P. M. by the pawl carrying member, it follows that excessive wear upon the ratchet wheel and pawls will result during the overtraveling and decelerating periods of movement of the latter,—the excessiveness of the wear upon the ratchet wheel and pawls being due to the length of the periods of ineffective engagement thereof and to the strength of the biasing springs required for the purpose aforementioned. Similarly with relatively heavy biasing springs such as are required for use upon ordinary pawls, it is found that the noise of the pawls during the periods of ineffective engagement thereof with the ratchet wheel is objectionable.

An object of the present invention is to provide an overtraveling clutch mechanism having pawls or dogs of improved constuction whereby all of the difficulties aforementioned are obviated.

Another and more specific object is to provide an improved overtraveling clutch mechanism whereby engagement of the pawls with the ratchet wheel is insured at all times pending attainment of a predetermined speed of the parts while minimizing the noise incident to ineffective engagement of the parts during the overtraveling and decelerating periods.

Another object is to provide a centrifugally operable counterbalanced pawl having spring means for normally biasing the same to a given operative position.

Other objects and advantages of the invention will hereinafter appear.

The accompanying drawings illustrate an embodiment of the invention, which will now be described; it being understood that the device illustrated is susceptible of modification without departing from the scope of the appended claims.

In the drawings, Figure 1 is a vertical sectional view, substantially on the line I—I of Fig. 2, of an overtraveling clutch mechanism having my improved pawls applied thereto.

Fig. 3 is a detail side elevational view of one of my improved counterbalanced pawls with the biasing spring applied thereto.

Fig. 4 is a top view of the pawl illustrated in Fig. 3, the spring being omitted for purposes of illustration, and Fig. 5 is a fragmentary detail view of the pawl showing the manner of attaching the spring thereto.

Figure 1:
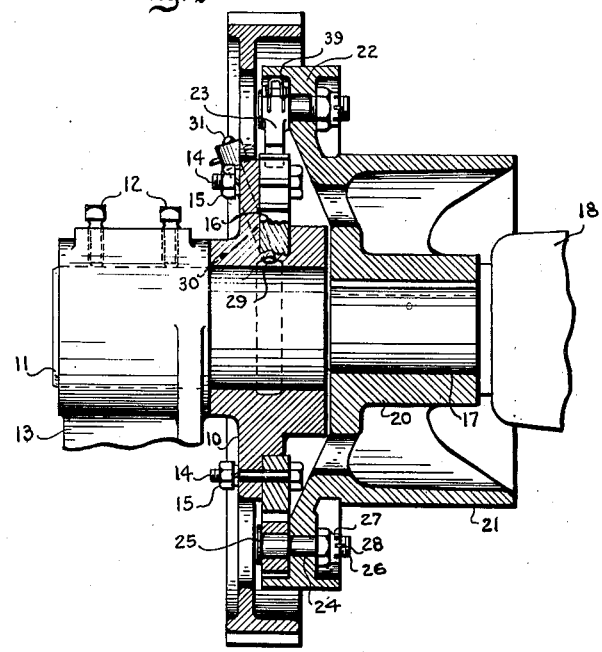
Figure 2:
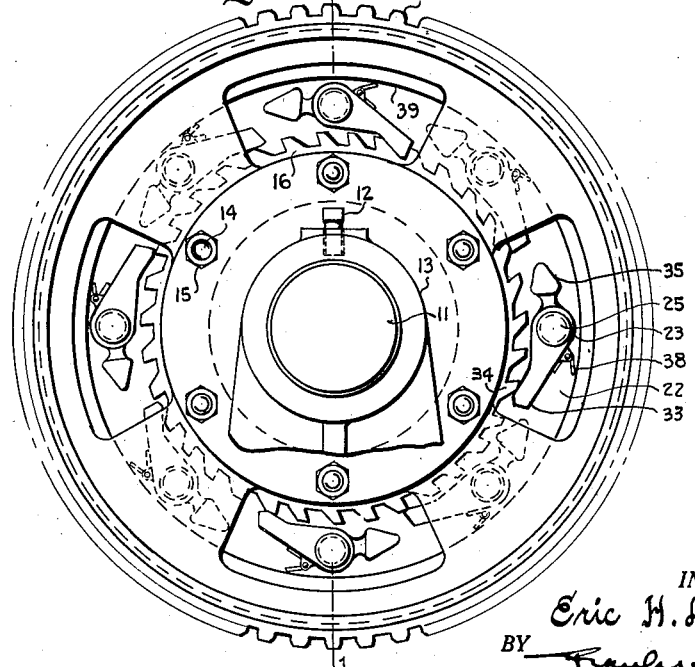
Fig. 2 is an end elevation of the clutch mechanism shown in Fig. 1, illustrating more clearly the form of the pawls.

Referring more particularly to Figs. 1 and 2, the numeral 10 designates a slow motion wheel or gear, which may be driven by the usual small motor through any suitable reduction gearing, not shown. Wheel 10 is adapted to rotate in the direction indicated by the arrow in Fig. 2, said wheel being freely rotatable on a stub shaft 11 which is fixed by means of set screws 12 or the like to a suitable pedestal or bracket 13.

Secured to the wheel 10 in the usual manner by means of bolts 14 and nuts 15 is a ratchet wheel 16, which as best shown in Fig. 2 is provided with thirty-five ratchet teeth. It will be understood by those skilled in the art, however, that a ratchet wheel having a different number of teeth may be employed if desired.

In longitudinal alinement with the stub shaft 11, and closely adjacent to the end of the latter but provided with clearance therefrom, is the shaft 17 of the large motor,—a portion of which is indicated at 18. As will be understood, the shaft 17 extends through the large motor, and is connected at the other end thereof through suitable gearing with the printing press or other machine to be driven.

Keyed or otherwise secured to the motor shaft 17 in any suitable manner is a member 20,—said member having the usual wheel portion 21 adapted to form one element of an electro-mechanical brake, and a disk portion 22 to which a plurality (eight in the present instance) of pawls or dogs 23 are pivotally secured. The means for pivotally supporting the pawls 23 preferably comprise individual bolts or pins 24 having relatively thin disk-shaped heads 25 and reduced screw-threaded end portions 26 adapted to receive castellated nuts 27 which are locked in position by means of cotter pins 28 in the usual manner.

As best shown in Fig. 1 the slow motion wheel 10 may be provided with an internal annular groove 29 in the hub portion thereof, said groove being in communication with a duct 30 to provide for supplying lubricant to the stub shaft 11 through the usual ball closed opening 31 at the outer end of said duct.

As shown in detail in Figs. 3 and 4, the pawls 23 are provided with hub portions 32 for pivotal support thereof by the bolts 24 as aforedescribed. Each pawl is provided on one side of the hub 32 thereof with a tooth engaging portion 33, which may preferably be of the form shown, for cooperation with the teeth 34 of ratchet wheel 16; and on the opposite side of hub 32 is a weight portion or counterbalance 35. The weight of the portion 35 is preferably equal to about nine-tenths of the weight of the tooth engaging portion 33, so that the pawls on the upper half of the clutch, when the elements of the latter are at rest, will be slightly biased by gravity into engagement with the ratchet wheel. Conversely, under the conditions just assumed, the pawls on the lower half of the clutch will be slightly biased by gravity out of engagement with the ratchet wheel; and hence I provide a spring for each of the pawls, said spring being preferably formed of a single wire having arms 36 and 37 to engage the portion 33 of the pawl and a looped portion 38 to engage the inner surface of the flange 39 on the pawl carrying disk 22. Each spring is provided with a coiled intermediate portion 40 to provide for proper positioning of the spring by a bolt or pin 41 passing therethrough. Bolt 41 is in turn supported by upstanding perforated lugs or ears 42 and 43 on the pawl 23.

In assembling the spring the coiled portion 40 is positioned to register with the perforations in said lugs and the bolt 41 is inserted therethrough,—the head 44 of the bolt abutting against the lug 42 and the other end of said bolt being finally slightly upset or riveted over the lug 43 as indicated at 45. If desired, the hubs 32 may be provided with drilled openings 46 to facilitate lubrication of the pawls.

In view of the fact that the springs are only required to overcome the slight preponderance of the weight of the tooth engaging portions 33 with respect to the weight of portions 35 in order to keep all of the pawls in engagement with the ratchet wheel when the parts are at rest, it is obvious that very light and sensitive springs may be employed.

Inasmuch as the springs herein employed are only required to be of sufficient strength to maintain the pawls on the lower half of the clutch in engagement with the ratchet wheel when the parts are at rest, it will be seen that said springs have substantially no actual controlling effect upon the pawls when the predetermined critical speed of the parts has been attained. On the other hand my arrangement permits design of the pawl in such manner that the center of gravity of the tooth engaging portion and the center of gravity of the counterweight portion are so related to the center of rotation of the pawl as to provide for substantial balancing of the centrifugal forces tending to cause disengagement and engagement of the pawl with the ratchet wheel at all relatively low speeds of the parts, but providing for rapid shifting of the centers of gravity of the respective portions upon attainment of a predetermined speed of the parts. Hence when the predetermined critical speed of the parts is reached during acceleration or deceleration the pawls move positively out of engagement or into engagement respectively, with the ratchet wheel, without oscillating between such positions due to changes in the radial location thereof with respect to the ratchet wheel. It follows from the foregoing that I am enabled to so proportion the mass of the counterweight portion of the pawl with respect to the tooth engaging portion of the latter as to provide for variation of the speeds required to effect disengaging or engaging movements of the pawl.

Thus, by means of the arrangement and combination of elements herein described, initial engagement of all of the pawls with the ratchet wheel is provided for, whereby co-operative engagement of one of the pawls with a tooth of the ratchet wheel is insured prior to travel of the latter through a distance equal to one-eighth of a tooth. The disadvantages attendant upon the use of ordinary pawls without springs are therefore obviated.

Similarly, by the employment of counterweighted pawls of the type herein contemplated the aforementioned results may be obtained by employment of very light springs. For instance, it has been found that with my arrangement, in a clutch of given size as aforementioned, the springs need only be strong enough to maintain engagement of the pawls with the ratchet wheel pending attainment of a speed of about 88 R. P. M. of the pawl carrying disk; whereas upon deceleration of the large motor the pawls will not re-engage the ratchet wheel until the speed of the pawl carrying disk has decreased to about 86 R. P. M. The periods during which the pawls ineffectively engage the ratchet wheel upon acceleration or deceleration of the large motor are therefore greatly reduced, as compared with the corresponding periods in a device wherein the ordinary form of pawls are provided with the relatively strong or heavy springs required.

Moreover by reason of my ability to employ extremely light or sensitive springs for accomplishment of the desired results, it follows that even during the periods of ineffective engagement of the pawls with the ratchet wheel (in overtraveling and deceleration) the pressure of the pawls is so light that no appreciable wear of the pawls and ratchet teeth results, whereas the noise incident to such ineffective engagement of the parts is reduced to a minimum, and is in fact not perceptible under operating conditions.

What I claim as new and desire to secure by Letters Patent is:

1. In an overtraveling clutch mechanism, in combination, a ratchet toothed wheel, a disk rotatable relatively to said wheel, a plurality of pawls pivotally carried by said disk and surrounding said wheel, spring means normally biasing each of said pawls inwardly into engagement with said ratchet wheel, said pawls and said ratchet teeth being so arranged that cooperative engagement of one of said pawls with one of said ratchet teeth is insured within a maximum travel of said wheel equal to a fraction of the distance between said teeth corresponding to the number of pawls employed, and a projection on each of said pawls adapted to counterbalance approximately ninety per cent of the weight of the latter whereby the biasing effect of said spring means may be so light as to insure disengagement of said pawls from said wheel under centrifugal action at a relatively low overtraveling speed of said disk, thus reducing to a minimum the period of overtraveling engagement of the pawls with said wheel during acceleration of said pawl carrying disk.

2. An overtraveling clutch mechanism comprising, in combination, a pair of members rotatable relatively to each other, thirty-five equally spaced peripheral ratchet teeth on one of said members, eight equally spaced pawls carried by the other of said members and surrounding said ratchet member, said pawls being counterbalanced to the degree of approximately ninety per cent, and spring means of just sufficient strength to normally bias said pawls into engagement with said ratchet member when the parts are at rest, whereby initial driving engagement of one of said ratchet teeth with one of said pawls is insured within a maximum travel of the former equal to one-eighth of the tooth pitch while providing for disengagement of said pawls at a relatively low overtraveling speed of said second mentioned member.

3. Overtraveling clutch mechanism comprising, in combination, a rotatable wheel having a plurality of equally spaced peripheral ratchet teeth, a rotatable disk adjacent thereto, a plurality of equally spaced pawls pivotally supported by said disk about the periphery of said wheel, each of said pawls having a ratchet tooth engaging portion and a counterbalancing portion of approximately nine-tenths of the weight of said tooth engaging portion, and each of said pawls being provided with a spring of just sufficient strength to bias the pawl into engagement with said ratchet wheel in any angular position of said disk when the parts are at rest while providing for disengagement of said pawls from said ratchet wheel by centrifugal force at a relatively low overtraveling speed of said disk, the number of said ratchet teeth being unequally divisible by the number of pawls, whereby initial driving engagement of one of said teeth with one of said pawls is insured prior to travel of said ratchet wheel through a distance greater than the pitch of the racthet teeth divided by the number of pawls employed.

4. A pawl for overtraveling clutch mechanism, comprising, in combination, a ratchet tooth engaging portion extending from one side of a point of pivotal support, a portion extending from the opposite side of said point of pivotal support and adapted to approximately counterbalance said first mentioned portion, and a relatively light pressure spring directly engaging said first mentioned portion and adapted to bias the same inwardly into engagement with a ratchet tooth, said first and second mentioned portions being so proportioned and arranged that the forces exerted thereby under centrifugal action are substantially equal at relatively low speeds of the clutch parts to render said spring effective to cause engagement of said first mentioned portion with said ratchet tooth and whereby at predetermined slightly higher speeds of said parts the centers of gravity of said portions with respect to the center of rotation thereof are adapted to be shifted to insure predominance of the force exerted by said first mentioned portion to effect disengagement thereof from said ratchet tooth against the action of said spring and said counterbalancing portion.

5. In an overtraveling clutch mechanism, in combination, a ratchet wheel comprising a multiplicity of equally spaced peripherally arranged ratchet teeth, a rotatable disk, a plurality of pawls pivotally supported thereby and arranged around said ratchet wheel, each of said pawls comprising a weight portion and an inwardly extending ratchet tooth engaging portion substantially counterbalanced thereby, said ratchet tooth engaging portion being biased, by its slight preponderance of weight, out of engagement with said ratchet wheel when said pawl is positioned below the center of rotation of said disk, and spring means of just sufficient strength to maintain the last mentioned portion of each of said pawls in engagement with said ratchet wheel irrespective of the rotary position of said disk when at rest.

6. In an overtraveling clutch mechanism, in combination, a ratchet wheel comprising a multiplicity of equally spaced peripherally arranged ratchet teeth, a rotatable disk, a plurality of pawls pivotally supported thereby and arranged around said ratchet wheel, each of said pawls comprising a weight portion and an inwardly extending ratchet tooth engaging portion substantially counterbalanced thereby, said ratchet tooth engaging portion being biased, by its slight preponderance of weight, out of engagement with said ratchet wheel when said pawl is positioned below the center of rotation of said disk, and spring means for maintaining the last mentioned portion of each of said pawls in engagement with said ratchet wheel irrespective of the rotary position of said disk when at rest, each of said tooth engaging portions being disengageable from said ratchet wheel under centrifugal action upon overtraveling movement of said disk at a speed of about 88 R. P. M.

7. In an overtraveling clutch mechanism, in combination, a ratchet wheel comprising a multiplicity of equally spaced peripherally arranged ratchet teeth, a rotatable disk, a plurality of pawls pivotally supported thereby and arranged around said ratchet wheel, each of said pawls comprising a weight portion and an inwardly extending ratchet tooth engaging portion substantially counterbalanced thereby, said ratchet tooth engaging portion being biased, by its slight preponderance of weight, out of engagement with said ratchet wheel when said pawl is positioned below the center of rotation of said disk, and spring means for maintaining the last mentioned portion of each of said pawls in engagement with said ratchet wheel irrespective of the rotary position of said disk when at rest, each of said tooth engaging portions being disengageable from said ratchet wheel under centrifugal action upon overtraveling movement of said disk at a speed of about 88 R. P. M. and said tooth portions being also re-engageable with said ratchet wheel only upon deceleration of said disk to a speed of about 86 R. P. M.

In witness whereof I have hereunto subscribed my name.

ERIC H. LAABS.